US008795136B2

(12) United States Patent
Bensch et al.

(10) Patent No.: US 8,795,136 B2
(45) Date of Patent: Aug. 5, 2014

(54) ACTUATING DEVICE AND METHOD FOR A VEHICLE PARKING BRAKE

(75) Inventors: Uwe Bensch, Hannover (DE); Guy Alain Djeutchouang Djiya, Hannover (DE); Jörg Helmer, Vogt (DE); Bernd-Joachim Kiel, Wunstorf (DE); Hartmut Rosendahl, Hannover (DE); Wolfgang Strache, Hemmingen (DE); Otmar Struwe, Hannover (DE); Matthias Tiedtke, Hannover (DE)

(73) Assignee: WABCO GmbH, Hannover (DE)

( * ) Notice: Subject to any disclaimer, the term of this patent is extended or adjusted under 35 U.S.C. 154(b) by 673 days.

(21) Appl. No.: 13/133,225

(22) PCT Filed: Oct. 13, 2009

(86) PCT No.: PCT/EP2009/007328

§ 371 (c)(1), (2), (4) Date: Sep. 27, 2011

(87) PCT Pub. No.: WO2010/078880

PCT Pub. Date: Jul. 15, 2010

(65) Prior Publication Data

US 2012/0006634 A1 Jan. 12, 2012

(30) Foreign Application Priority Data

Dec. 19, 2008 (DE) ........................ 10 2008 064 077

(51) Int. Cl.

| | |
|---|---|
| ***B60W 10/04*** | (2006.01) |
| ***B60T 17/22*** | (2006.01) |
| ***B60T 7/08*** | (2006.01) |
| ***B60T 13/66*** | (2006.01) |
| ***B60T 13/74*** | (2006.01) |
| ***B60T 7/10*** | (2006.01) |
| ***B60T 13/26*** | (2006.01) |

(52) U.S. Cl.

CPC ................ *B60T 7/107* (2013.01); *B60T 17/22* (2013.01); *B60T 7/085* (2013.01); *B60T 13/662* (2013.01); *B60T 13/74* (2013.01); *B60T 13/263* (2013.01)

USPC .......................................................... 477/182

(58) Field of Classification Search

USPC ............. 188/106 P, 31, 196 B; 477/182, 115; 192/220.2, 220, 220.4, 219.4

See application file for complete search history.

(56) References Cited

U.S. PATENT DOCUMENTS

| | | | | |
|---|---|---|---|---|
| 5,992,576 | A * | 11/1999 | Berg et al. | 188/69 |
| 2010/0244550 | A1* | 9/2010 | Hilberer | 303/15 |
| 2010/0304929 | A1* | 12/2010 | Hilberer | 477/183 |
| 2010/0326787 | A1 | 12/2010 | Giefer et al. | |

FOREIGN PATENT DOCUMENTS

| | | | |
|---|---|---|---|
| DE | 197 21 166 | A1 | 2/1998 |
| DE | 100 25 731 | A1 | 12/2000 |
| DE | 10 2007 021 831 | A1 | 11/2008 |
| EP | 1 997 700 | A2 | 12/2008 |
| WO | WO 03/097423 | A2 | 11/2003 |

* cited by examiner

*Primary Examiner* — Justin Holmes
*Assistant Examiner* — David J Hlavka
(74) *Attorney, Agent, or Firm* — Kramer Levin Naftalis & Frankel LLP

(57) ABSTRACT

An actuating device includes a vehicle operating brake and parking brake. A first braking effect is generated by the parking brake independently of a braking procedure for the operating brake. The actuating device comprises a first switched state, wherein the first braking effect of the parking brake cannot be provided, and a second switched state, wherein the first (full) braking effect of the parking brake is provided. The actuating device further comprises a manually actuatable operating element for actuating the parking brake that comprises travel positions. The actuating device is switched to the second switched state in a first travel position when the parking brake is released, and to the first switched state when the parking brake is applied. Also, the actuating device is switchable to a further switched state. In an actuating method, the actuating device is switched to the further switched state in response to an actuation.

24 Claims, 11 Drawing Sheets

2
16
Engage / release the parking brake
12
18
8
17
14
6
Activate trailer testing function
4
20
10

ACTUATING DEVICE AND METHOD FOR A VEHICLE PARKING BRAKE

FIELD OF THE INVENTION

The invention generally relates to an actuating device and method for a vehicle parking brake.

BACKGROUND OF THE INVENTION

Vehicles, in particular utility vehicles, have service brakes for driving operation and parking brakes for immobilizing the vehicles. A so-called first braking action can be generated by means of the parking brake independently of a braking process of the service brake. A known actuating device that is part of the vehicle brake system actuates the parking brake.

The known actuating device has a manually actuated control element for actuating the parking brake. If the parking brake is engaged, the actuating device can be switched into a first switching state in which the parking brake is released. The control element has a plurality of deflection positions. In a first deflection position, if the parking brake is released, the actuating device can be switched into a second switching state in which the parking brake is engaged.

A brake system equipped with the known actuating device can have at least one further braking function, for example a trailer testing function, a trailer braking function and/or an anti-jackknifing braking function. Controlling a multiplicity of functions of the brake system can be confusing for the vehicle driver and is often not possible in a readily intuitive manner.

SUMMARY OF THE INVENTION

Generally speaking, it is an object of the present invention to provide for simple and intuitive control of a vehicle brake system. This is achievable by means of an actuating device of the general type under consideration, which can be switched into a further switching state, and by means of an actuation method, wherein in response to an actuation, the actuating device is switched into the further switching state.

The actuating device can be switched into the first switching state, the second switching state and the further switching state by the same control element. By the further switching state, it is possible, for example, for a trailer testing function and/or a trailer braking function and/or an anti-jackknifing braking function to be selected by one and the same control element, or a function that prevents an automatic engagement of the parking brake upon the deactivation of an ignition can be selected by means of the actuating device, in particular by one and the same control element. The actuating device has, aside from the control element, at least one electronic system for providing switching states. The actuating device may however also have further components of the brake system, in particular control electronics, power electronics and brake actuators.

The control element of the actuating device according to embodiments of the invention can be controlled intuitively and more easily than the control element of the known actuating device, by means of which a trailer testing function can be selected, or by means of which, in combination with a separately arranged further control element, a trailer braking function and/or an anti-jackknifing braking function or a deactivation of an automatic engagement of the parking brake upon the deactivation of the ignition can be selected. Simple and intuitive control is also possible in the case of a further control element, which is actuated separately, for deactivating the automatic engagement of the parking brake upon the deactivation of the ignition.

The invention saves on at least one control element by "multiple assignment". In this way, space is saved on the dashboard in the vehicle cab. Space is limited because a multiplicity of control elements is conventionally arranged on the dashboard.

The invention also saves on costs because fewer control elements, and no separate actuating device for deactivating the automatic engagement of the parking brake upon the deactivation of the ignition, need be produced and installed in the vehicle.

It is possible for a trailer vehicle to be coupled to the vehicle. By means of the parking brake, a second braking action for the trailer vehicle can likewise be generated, independently of a braking process of the service brake of the tractor vehicle. In the first switching state, the second braking action of the parking brake cannot be provided. In contrast, in the second switching state, the full braking action of the parking brake can be provided.

The control element has a predetermined neutral position and is designed so as to assume neutral position when not subjected to external action. The deflection positions are spaced apart from the neutral position in different directions.

In the further switching state, the second braking action but not the first braking action is changed in relation to the first and/or second switching state. The further switching state may therefore, for example, select a trailer testing function, a trailer braking function or an anti-jackknifing braking function.

The trailer testing function tests whether a vehicle combination composed of the tractor vehicle and the trailer vehicle can be immobilized solely by means of the parking brake of the tractor vehicle. For the trailer testing function, only the first braking action on the vehicle can be provided, while the second braking action on the trailer vehicle cannot be provided.

The vehicle advantageously has combined spring brake cylinders, wherein a diaphragm part of the spring brake cylinders is assigned to the service brake and a spring store part is assigned to the parking brake. To immobilize the vehicle by means of the parking brake, the spring store parts, which are aerated during driving operation, are deaerated, as a result of which a spring provides brake application energy in order to obtain the first braking action.

In contrast, the trailer vehicle has brake cylinders that can be aerated and therefore actuated both by the service brake and also by the parking brake. The brake cylinders, and if appropriate further components of the brake system, can therefore be assigned both to the service brake and also to the parking brake.

If the trailer testing function is activated, the brake cylinders of the trailer vehicle are deaerated such that the vehicle combination is held solely by means of the parking brake of the tractor vehicle.

In contrast, in the trailer braking function and in the anti-jackknifing braking function, the parking brake of the vehicle is released while the brake cylinders of the trailer vehicle are aerated and therefore actuated. Here, the trailer brake function is used inter alia to test whether the trailer vehicle is correctly coupled to the vehicle. Specifically, a trailer vehicle not correctly coupled would become detached from the vehicle if the trailer braking function were activated when the vehicle drives off.

In contrast, the anti-jackknifing braking function is used at low speeds in order to keep the vehicle stretched out in curves for example on a downward sloping roadway.

The invention may alternatively also be used in vehicle combinations or vehicles with other types of brakes, for example electromechanically actuatable brakes.

Overall, in the further switching state in this initial embodiment, the second braking action, specifically the braking action on the trailer vehicle, is always changed either in relation to the first or in relation to the second switching state or either in relation to the released or in relation to the engaged parking brake of the vehicle. In particular, in the further switching state, the second braking action is changed in relation to the first switching state in that the brake cylinders of the trailer vehicle are now actuated, or is changed in relation to the second switching state in that brake cylinders of the trailer vehicle are now released or are at least actuated such that a comparatively low second braking action can be obtained. In the extreme case, however, in the further switching state, the second braking action may be inverted in relation to the second braking action in the first or second switching state or in relation to the first braking action in the further switching state.

In a first embodiment, which builds on the initial embodiment described above, if the parking brake is engaged, the actuating device, in a second deflection position, can be switched into the first switching state in order to release the parking brake. Here, the switch into the first switching state takes place either in the second deflection position or alternatively only when the control element is no longer actuated or the second deflection position has been departed from.

In contrast, in the first deflection position, the actuating device can be switched into the further position in order to provide a trailer testing function if the second switching state was activated previously. The further switching state is a third switching state in which the first braking action but not the second braking action can be provided. The first deflection position is therefore doubly assigned, with two functions. Specifically, if the parking brake is released, the parking brake is engaged in response to an actuation of the control element in the first deflection position. In contrast, if the parking brake is engaged, or after repeated actuation of the control element in the first deflection position, the trailer testing function is activated for as long as the control element is actuated in the first deflection position. After a return into the neutral position, the parking brake for the tractor vehicle and the trailer vehicle is engaged again, or the second switching state is assumed again.

In an alternative, second embodiment, which builds on the initially described embodiment, the first deflection position is again doubly assigned, but in this case with the functions “engagement” and “release” of the parking brake. Therefore, if the parking brake is engaged, the actuating device, in the first deflection position, can be switched into the first switching state in order to release the parking brake. The switch into the second switching state also takes place in the first deflection position. If appropriate, the actuating device can however also be designed such that it is switched into the first switching state only after the first deflection position has been departed from, in particular when the neutral position is reached.

In contrast, in a second deflection position, the actuating device can be switched into the further switching state in order to provide a trailer testing function if the second switching state was previously activated. The further switching state is again a third switching state in which the first braking action but not the second braking action can be provided. It is therefore possible by means of the first deflection position for the parking brake to be alternately engaged and released again, while if the parking brake is engaged and if the control element is actuated in the second deflection position, the trailer testing function is activated for as long as the control element is actuated in the second deflection position. In contrast, in the event of actuation in the second deflection position if the parking brake is released, the second deflection position has no function.

In another embodiment of the invention, which builds on the embodiments described above, if the parking brake is released, the actuating device, in the second deflection position or in response to a preceding deflection in the second deflection position, can be switched into a fourth switching state in particular in order to provide a trailer braking function. In the fourth switching state, the second braking action but not the first braking action can be provided. Therefore, both the first deflection position and also the second deflection position are in each case doubly assigned with functions. It is consequently possible to save on a further control element, specifically a separate control element for activating the trailer brake function. The control of the control element is nevertheless still possible in an intuitive manner.

The actuating device preferably has a detector by which a vehicle standstill state or a vehicle speed can be detected, wherein the actuating device can be switched into the fourth switching state only if the vehicle standstill state is detected or a low vehicle speed is detected, that is up to a maximum speed of less than 5 km/h. The trailer braking function can therefore be activated only if this is possible without risk, specifically in the vehicle standstill state or at low vehicle speed.

The detector may additionally be assigned another function, and for example provide data for a speed display and/or an anti-lock system.

If the trailer braking function is activated, it is possible to identify a correctly coupled trailer vehicle by means of a drive-off or advancement of the pulling vehicle. A change is advantageously automatically made from the fourth switching state to the first switching state above a predefined vehicle speed, for example 5 km/h, since the trailer vehicle, which may be a semitrailer, must not be pulled at relatively high speeds, that is higher than 5 km/h, with braked wheels.

According to an embodiment of the invention, the second deflection position of the control element is even triply assigned. Specifically, if the parking brake is released, the actuating device, in the second deflection position, can be switched into a fifth switching state in order to provide an anti-jackknifing braking function, wherein the second braking action exceeds the first braking action, in particular the second braking action but not the first braking action can be provided. Therefore, if the parking brake is released and for as long as the control element is actuated in the second deflection position, either the trailer braking function or the anti-jackknifing function is activated.

Here, the anti-jackknifing braking function is preferably activated if the vehicle is at a speed that lies within a predefined or predefinable speed interval, in particular between for example 5 km/h and for example 60 km/h. The vehicle therefore has a detector by means of which a vehicle standstill state or a vehicle speed can be detected. If a detected vehicle speed lies within the predefined or predefinable speed interval, the actuating device can be switched into the fifth switching state. Inadvisable operation of the control element, which may be dangerous in some circumstances, in particular an activation of the anti-jackknifing function at excessively high speed, is thereby ruled out.

If the parking brake is released and if a detected residence time lies below a predefined or predefinable limit actuation time, the actuation device can preferably be switched into the fifth switching state, wherein, in order to provide an anti-jackknifing function, the second braking action exceeds the first braking action, in particular the second braking action but not the first braking action can be provided. The anti-jackknifing function can therefore alternatively or additionally be actuated or activated in a vehicle standstill state, specifically in the event of a sufficiently long-duration actuation of the control element in the second deflection position. For this purpose, the residence time of the control element in the second deflection position can be detected. The anti-jackknifing braking function can therefore be activated at the correct time, and remains activated, if appropriate even after a return into the neutral position, until the second or if appropriate the first deflection position is reached again or, if appropriate, the anti-jackknifing braking function is manually or automatically deactivated in some other way.

A third embodiment of the invention, which is an alternative to the first and second embodiments but which, like the first and second embodiments, builds on the initial embodiment described herein, provides that, if the parking brake is engaged, the actuating device, in a second deflection position, can be switched into the first switching state in order to release the parking brake. Furthermore, the control element has a third deflection position, wherein the actuating device, if the parking brake is released, can be switched into the further switching state in order to provide the anti-jackknifing braking function. In contrast to the first or second embodiments, the further switching state is now not a third but rather a fifth switching state in which the second braking action exceeds the first braking action, in particular the second but not the first braking action can be provided. The control element is therefore designed structurally so as to permit a third deflection position, and therefore multiple assignment of the first or second deflection positions is not required.

In the third deflection position, the second braking action can preferably be varied in a continuous or stepped fashion, wherein the third deflection position is arranged in a so-called first deflection region, which is in particular adjacent to the neutral position, and the second braking action is dimensioned according to a position in the first deflection region. The anti-jackknifing braking function is therefore not only activated and deactivated again, but rather can be controlled individually in terms of its intensity.

In another embodiment, the control element has a fourth deflection position arranged in a second deflection region arranged in particular adjacent to the neutral position. The actuating device, in the fourth deflection position, in particular if the parking brake is released, can be switched into a sixth switching state in order to provide a dynamic braking function, wherein the first braking action and the second braking action can be provided in a continuous or stepped fashion and wherein the first braking action and the second braking action are dimensioned according to a position in the second deflection region. The parking brake can therefore be used similarly to the service brake and apportioned both for the tractor vehicle and also for the trailer vehicle. The apportionment takes place here by means of the control element.

In this embodiment, too, the control element assumes the neutral position when not subjected to external action; in particular, the control element moves from the first deflection region or second deflection region back into the neutral position preferably in a damped manner, such that after the control element is released, the first braking action and the second braking action, or if the anti-jackknifing braking function is activated preferably only the second braking action, are or is reduced.

In another embodiment, the actuating device is designed such that, in response to a departure from the third or fourth deflection position and/or in response to a departure from the first or second deflection region, in particular in response to a return into the neutral position, the actuating device is switched back into the first switching state in order to release the parking brake, in particular if the actuating device was situated in the first switching state before the actuation into the third or fourth deflection position and/or into the first or second deflection region.

In the third embodiment of the actuating device, the control element or an actuator of the control element can be pushed and pulled along an axis and pivoted about the axis, in particular in relation to a base element of the control element, wherein proceeding from the neutral position, the first deflection position can be reached by pulling, the second deflection position can be reached by pushing, if appropriate the third deflection position can be reached by pivoting in a first direction, and if appropriate the fourth deflection position can be reached by pivoting in a second direction. Comfortable control of the anti-jackknifing braking function or if appropriate of the dynamic braking function is made possible in this way. Furthermore, the parking brake can be activated and deactivated easily and quickly. The control element may have, as an actuator, for example a lever or knob.

The control element is preferably designed such that the first and second deflection positions can be reached proceeding from the second and first deflection positions, that is from in each case the other deflection position, and also proceeding from the third and if appropriate proceeding from the fourth deflection position, only via the neutral position. If the control element is situated in the third or if appropriate in the fourth deflection position, the control element, in response to a pulling or pushing action, moves first into the neutral position and if appropriate thereafter into the first or second deflection position. This counteracts inadvisable operation. The parking brake can be engaged only when the dynamic braking function or the anti-jackknifing braking function has been deactivated.

In another embodiment that builds on the embodiments discussed above, the actuating device can be switched into a seventh switching state. As an alternative to this, the further switching state is the seventh switching state. In this case, a trailer vehicle need not imperatively be coupled, or able to be coupled, to the vehicle.

The actuating device or a brake system equipped with the actuating device has an automatic system that immobilizes the vehicle when the ignition is deactivated. The parked vehicle is thereby prevented from inadvertently rolling away. If the actuating device is in the first switching state, the actuating device can therefore be automatically switched into the second switching state in response to a deactivation of the ignition.

However, if the actuating device is in the seventh switching state when the ignition is deactivated, an automatic immobilization of the vehicle is prevented. The vehicle may be parked in an unbraked manner, which may be necessary or advantageous for example in a workshop, in the event of the replacement of brake linings, in the event of towing, and in order to prevent the brakes from freezing solid.

In one advantageous embodiment, the actuating device is designed such that, in the deflection position of the control element, it is switched into the seventh switching state for the duration of its actuation, and is switched into the first switching state only after departing from the deflection position or after returning into the neutral position or after the end of the actuation. The actuating device is therefore situated in the seventh switching state for the duration of the actuation of the control element. Consequently, an automatic engagement of the parking brake is prevented if the ignition is deactivated during the actuation of the control element. However, if the ignition is first deactivated when the control element is no longer actuated, then the parking brake is automatically engaged. Specifically, after the end of the actuation of the control element, the actuating device is situated no longer in the seventh switching state but rather in the first switching state, in which the automatic switch in the second switching state to automatically engage the parking brake is not prevented.

Alternatively or in addition to the switch into the seventh switching state by virtue of the control element being "kept depressed", a further control element for switching may also be provided, wherein the actuating device, in response to an actuation of the further control element, can be switched into the seventh switching state for the duration of the actuation or for a predetermined time duration or until the actuation of the control element or until the renewed actuation of the further control element or until the actuation of another further control element. Here, the further control element is advantageously a control element already provided for a further function, such that, as a result of multiple assignment of the further control element, a separate control element solely for selecting the seventh switching state is not required.

A switch into a deflection position may take place if the control element has the respective deflection position. If appropriate, however, this may also be understood to mean that the switch takes place only when the control element is no longer actuated, or has departed from the respective deflection position or the respective deflection region or has changed its position in the deflection region.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

The invention will be discussed in greater detail below using exemplary embodiments and with reference to the appended drawings, in which.

DETAILED DESCRIPTION OF THE PREFERRED EMBODIMENTS

Figure 1:
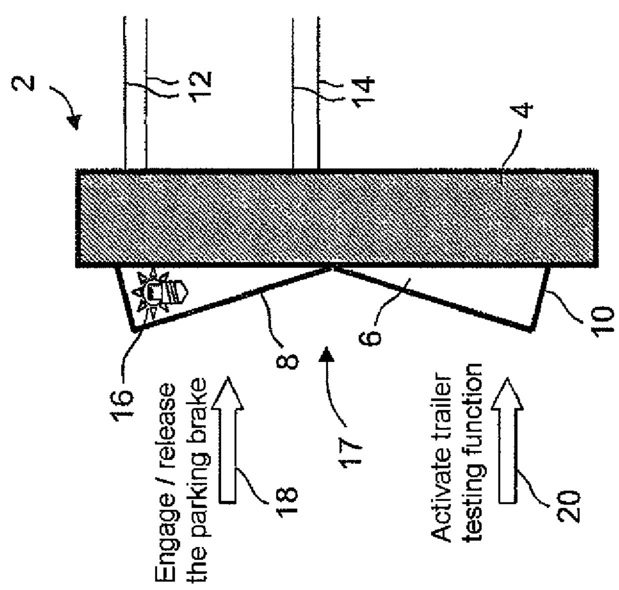
FIG. 1 shows a first control element of an actuating device according to a first exemplary embodiment of the invention.

Referring now to the drawing figures, FIG. 1 shows a control element 2 of an actuating device according to a first exemplary embodiment of the present invention. The control element 2 has a base element 4 and an actuator 6, which can be a rocker switch as shown. The rocker switch 6 in turn has an upper touch region 8 and a lower touch region 10. The control element 2 also has electrical terminal pairs 12 and 14. Furthermore, a lamp 16, for example a light bulb or a light-emitting diode, is arranged behind the upper touch region 8.

The control element 2 can be actuated manually by virtue of pressure being exerted on the upper touch region 8 or the lower touch region 10. To actuate the control element 2, the rocker switch 6 is pivoted about an axis perpendicular to the plane of the drawing by virtue of pressure being exerted on the upper touch region 8 or the lower touch region 10 from the left. While the upper touch region 8 is pivoted in the direction of the base element 4, the lower touch region 10 is pivoted away from the base element 4, and vice versa.

When not subjected to external action, the control element 2 assumes a predetermined neutral position 17, which is illustrated in FIG. 1. The actuation of the control element 2 takes place counter to the pressure of at least one spring. The spring preferably has a progressive characteristic curve. The spring may however also have a digressive or proportional characteristic curve.

The lamp 16 may be illuminated for a duration of actuation of the control element 2, but may alternatively also be activated such that an illumination of the lamp 16 is assigned to a switching state of the actuating device. Correspondingly, a non-illumination of the lamp 16 may be assigned to some other switching state of the actuating device. It is also possible for lamps with different colors to be provided, wherein each color is assigned to a different switching state. Furthermore, a lamp may additionally or alternatively be provided behind the lower touch region 10. It is alternatively also possible for the lamp 16 to be arranged remote from the rocker switch 6, and if appropriate also remote from the control element 2.

The actuating device serves for actuating a parking brake of a vehicle, wherein in this exemplary embodiment of the invention, a trailer vehicle may be coupled to the vehicle, and wherein the vehicle and the trailer vehicle together form a vehicle combination. Here, the trailer vehicle may in particular be a semitrailer.

The vehicle has a service brake provided for driving operation and has a parking brake provided for immobilizing the vehicle. Here, a first braking action for the vehicle and a second braking action for the trailer vehicle can be generated by means of the parking brake independently of a braking process of the service brake.

In response to a depression of the upper touch region 8 of the rocker switch 6, the control element 2 arrives in a first deflection position 18, which is spaced apart from the neutral position 17 and which is symbolized by an arrow. In contrast, in response to a depression of the lower touch region 10 of the rocker switch 6, a second deflection position 20 of the control element 2 is reached, which is spaced apart from the neutral position 17 and which is symbolized by a further arrow.

The actuating device can be switched into a plurality of switching states. The switching states can be selected alternatively, such that only one switching state is active at any given time. A change between the switching states takes place by means of an actuation of the control element 2. If appropriate, however, a switch may be made between the switching states automatically, for example as a function of driving states or vehicle states.

In the first exemplary embodiment, the first deflection position 18, which is reached in response to an actuation of the upper touch region 8 of the rocker switch 6, is doubly assigned. In a first switching state, the parking brake is released, wherein the first braking action and second braking action of the parking brake cannot be provided. In response to the first deflection position 18 being reached, the actuating device switches into the second switching state in which the parking brake is engaged. Thereafter, the neutral position 17 must first be reached before the actuating device, in response to the first deflection position 18 being reached again, can switch back again into the first switching state.

The actuating device may be designed such that it is switched directly into the first switching state when the first deflection position 18 is reached. Alternatively, however, the actuating device may also be designed such that it, in the first deflection position 18, is switched initially into a seventh switching state for as long as the control element 2 is situated in the first deflection position 18. Only in response to a departure from the first deflection position 18 or in response to the neutral position 17 being reached is the actuating device in this case switched back into the first switching state.

In the seventh switching state, the parking brake is released. The first and seventh switching states differ from one another in that the actuating device, in the first switching state, is automatically switched into the second state in response to a deactivation of the ignition, in order to prevent the parked vehicle from inadvertently rolling away. In contrast, in the seventh switching state, an automatic switch into the second switching state is prevented.

The automatic engagement of the parking brake may be a parameterizable function of the actuating device. In particular, the function may be integrated into the actuating device as an option, or integrated into the actuating device as standard but selectively activated or deactivated, by the manufacturer of the actuating device or of a vehicle that has the actuating device. For this purpose, for example, a function is provided in an item of software, which function can be selectively activated or deactivated in the software.

If the actuating device is situated in the second switching state, or if the parking brake is engaged, the actuating device, in response to the second deflection position 20 being reached, can be switched into a further, specifically a third, switching state. In the third switching state, for a trailer testing function, the second braking action is not provided, or the parking brake of the trailer vehicle is released, for the duration of actuation of the control element 2, in particular for as long as the second deflection position is reached or for as long as the neutral position is not reached again. It is therefore possible to establish whether the first braking action, or the parking brake of the vehicle or tractor vehicle, is capable of holding the entire vehicle combination including the unbraked trailer vehicle, immobilized. This is advantageous if the vehicle combination is to be parked for a relatively long time and the second braking action is attained only when brake cylinders on the trailer vehicle are aerated. Specifically, if the brake cylinders are deaerated after a relatively long time as a result of a pressure loss, the second braking action is lost, such that the vehicle combination must be held by means of the first braking action of the parking brake of the tractor vehicle alone.

Figure 2:
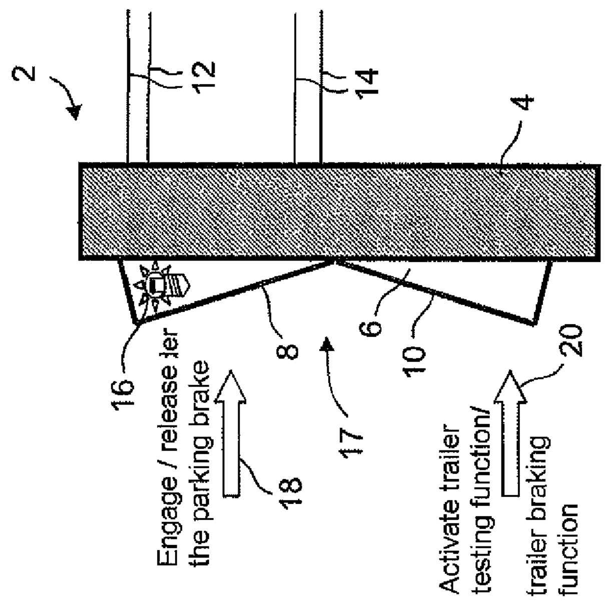
FIG. 2 shows the control element of FIG. 1 of an actuating device according to a second exemplary embodiment of the invention.

FIG. 2 shows the control element 2 of FIG. 1 in an actuating device according to a second exemplary embodiment of the invention. The control element 2 of the second exemplary embodiment is therefore, like the control element 2 of the exemplary embodiments 3, 4, 5 and 6, structurally the same as the control element 2 described in connection with the actuating device.

The actuating device of the second exemplary embodiment differs from the actuating device of the first exemplary embodiment according to FIG. 1 in that the second deflection position 20 is also doubly assigned with switchable functions. Whereas in the actuating device according to the first exemplary embodiment an arrival in the second deflection position 20 proceeding from the first switching state may remain without function, it is the case in the second exemplary embodiment that, for the duration of the actuation, a fourth switching state is activated that provides, for example, a trailer braking function. Therefore, if the parking brake is released, by depressing the lower touch region 10, or upon a deflection that reaches the second deflection position, the trailer vehicle can temporarily be braked.

For safety reasons, the activation of the fourth switching state is coupled to the vehicle either being at a standstill or at least travelling at a speed of less than 5 km per hour. In response to an activation of the trailer braking function, the trailer vehicle is abruptly braked, which can be perceived by the vehicle driver as a jerk, or which restrains the tractor vehicle as it drives away. From this, the driver can identify whether the trailer vehicle is correctly coupled to the vehicle and whether the brakes of the trailer vehicle are generating a braking action.

The further functionality of the actuating device according to the second exemplary embodiment corresponds to the functionality of the actuating device described in the first exemplary embodiment.

Figure 3:
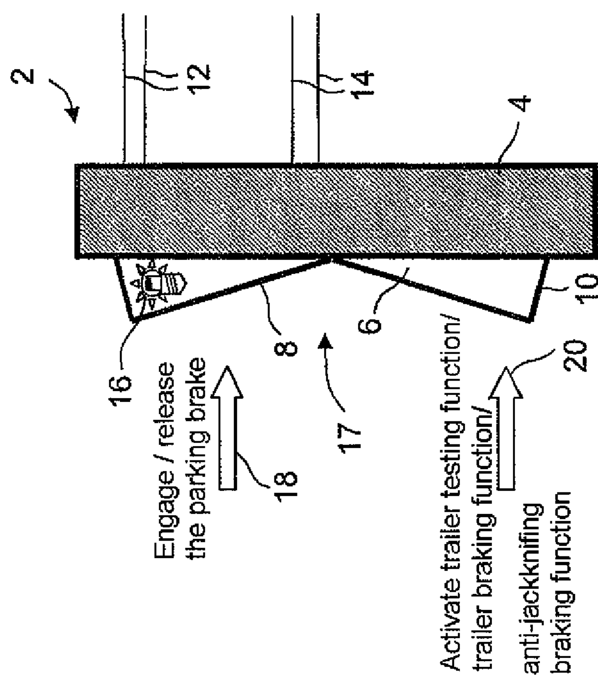
FIG. 3 shows the control element of FIG. 1 of an actuating device according to a third exemplary embodiment of the invention.

FIG. 3 shows the control element 2 in an actuating device according to a third exemplary embodiment of the invention. The third exemplary embodiment builds on the second exemplary embodiment. In particular, the first deflection position 18 is again doubly assigned with the functions of engagement and release of the parking brake. In this case, however, the second deflection position is not only doubly assigned with the temporary switching into the third or fourth switching state or with the temporary activation of the trailer testing function and the trailer braking function, but rather is triply assigned. Specifically, a fifth switching state or an anti-jackknifing braking function is additionally provided.

The fifth switching state, like the fourth switching state, is selected proceeding from the first switching state when the second deflection position 18 is reached. Here, the actuating device decides, as a function of a detected vehicle speed, whether a switch into the fourth or fifth switching state should be carried out or the actuating device should remain in the first switching state. If the vehicle is at a standstill or at low speeds of less than 5 km per hour, the actuating device is switched into the fourth switching state and the trailer braking function is activated. In contrast, in an interval between 5 km per hour and 60 km per hour, the anti-jackknifing braking function is activated.

At higher speeds, the actuating device remains in the first switching state. Also, if the maximum speed of 5 km per hour for the trailer braking function is reached or a limit of the speed interval between 5 km per hour and 60 km per hour is exceeded during the anti-jackknifing braking function, the actuating device is automatically switched back into the first switching state.

If appropriate, it is also possible for an acoustic or visual warning signal to be output, and for an automatic switch back into the first switching state to be made only after a predefined time duration, in order to enable the driver to correspondingly adjust the vehicle speed and thereby be able to prevent an undesired switch back into the first switching state.

The anti-jackknifing function can provide the full second braking action for the trailer vehicle. Alternatively, however, the anti-jackknifing function may also provide a braking action for the trailer vehicle that is reduced in relation to the full second braking action. A braking action may be predefined or also adjustable.

If appropriate, the control element 2 may also be of some other design. The anti-jackknifing braking function may for example be actuatable in a stepped or continuous fashion by means of the rocker switch 6. An actuation of the rocker switch 6 with a comparatively low pressure on the lower touch region 10 leads for example to only a low second braking action on the trailer vehicle. A correspondingly higher pressure increases the second braking action. Alternatively, the braking action may be adjusted by means of a separate control element.

In a further alternative to the third exemplary embodiment, the actuating device is not switched from the fifth switching state into the first switching state when the second deflection position 20 is departed from or the neutral position 17 is reached. Instead, the anti-jackknifing braking function is activated until the second deflection position 20 is reached again or the first deflection position 18 is reached or an electronic system automatically deactivates the fifth switching state and switches back into the first switching state in response to an identified defined driving state or vehicle state.

Figure 4:
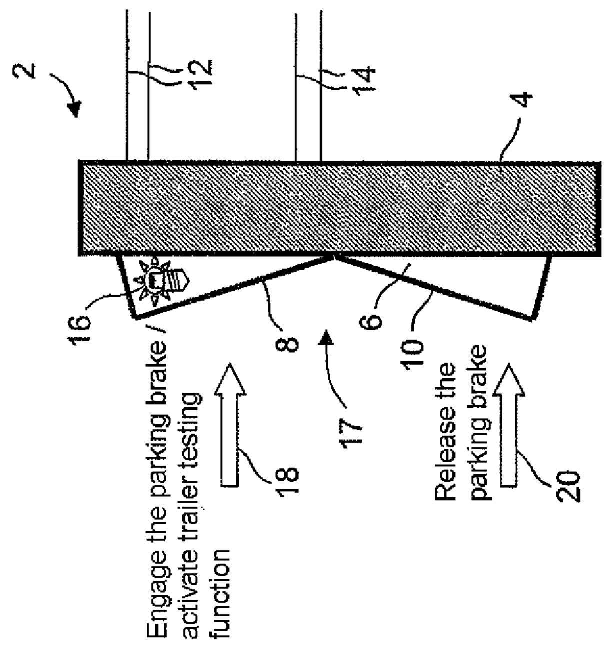
FIG. 4 shows the control element of FIG. 1 of an actuating device according to a fourth exemplary embodiment of the invention.
Figure 6:
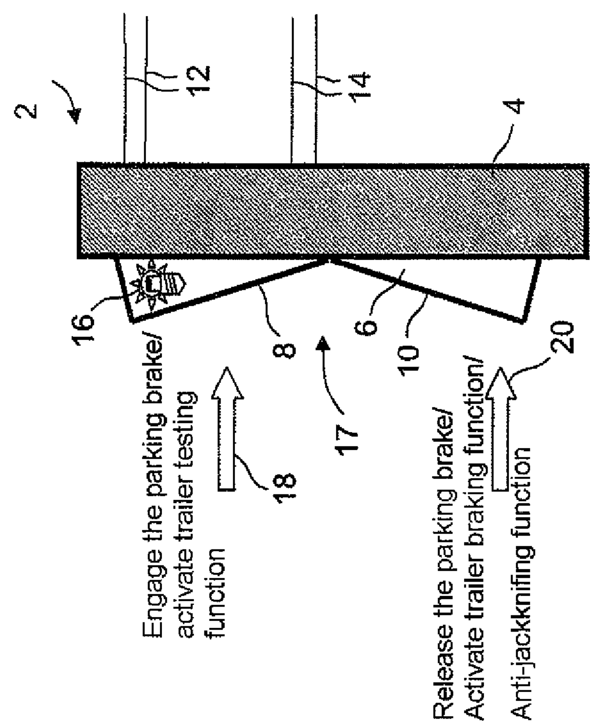
FIG. 6 shows the control element of FIG. 1 of an actuating device according to a sixth exemplary embodiment of the invention.
Figure 5:
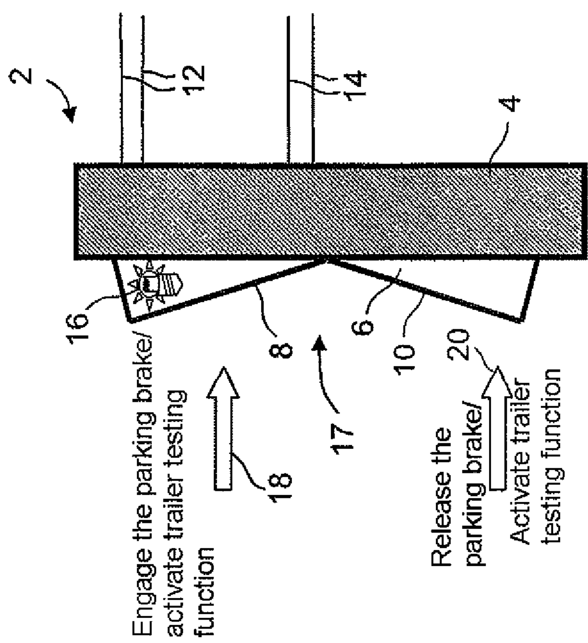
FIG. 5 shows the control element of FIG. 1 of an actuating device according to a fifth exemplary embodiment of the invention.

FIG. 4, FIG. 5 and FIG. 6 show actuating devices according to a fourth, a fifth and a sixth exemplary embodiment of the invention. The actuating devices are similar to the actuating devices according to the exemplary embodiments depicted in FIGS. 1, 2 and 3. In particular, the actuating devices again have the same control element 2. Also, the first deflection position 18 is again doubly assigned, while the second deflection position 20 is singly, doubly and triply assigned respectively. However, in the exemplary embodiments depicted in FIGS. 4, 5 and 6, in contrast to the exemplary embodiments depicted in FIGS. 1, 2 and 3, the first switching state can be reached in the second deflection position 20, and the third switching state can be reached in the first deflection position 18. The conditions for reaching the first and third switching states are those described above. Also, the above-described alternatives to the actuating devices according to the exemplary embodiments depicted in FIGS. 1, 2 and 3 may analogously also be provided as alternatives for the actuating devices according to the exemplary embodiments depicted in FIGS. 4, 5 and 6.

In the actuating devices according to the exemplary embodiments depicted in FIGS. 4, 5 and 6, both the engagement of the parking brake and also the trailer testing function, which can be temporarily activated when the parking brake is engaged are assigned to the first deflection position 18. The driver can therefore initially engage the parking brake and thereafter activate the trailer testing function without changing touch region 10.

Correspondingly, the release of the parking brake is assigned, if appropriate together with the trailer braking function, which can be temporarily activated when the parking brake is released, and if appropriate the anti-jackknifing braking function, to the second deflection region 20. The driver therefore has clearly separate touch regions 8 and 10 for engaging and for releasing the parking brake. Furthermore, with the actuating devices according to the exemplary embodiments depicted in FIGS. 5 and 6, the driver can activate the trailer braking function directly after the release of the parking brake without having to change from the lower touch region 10 to the upper touch region 8 or to a separate control element. A corresponding situation applies for the anti-jackknifing braking function according to the sixth exemplary embodiment, wherein here, the vehicle should however be accelerated between the release of the parking brake and the engagement of the anti-jackknifing braking function, such that the vehicle speed lies in the predefined speed interval.

Alternatively, however, the anti-jackknifing braking function may also be activated even at a standstill or at speeds of less than 5 km/h, for example if the second deflection position 20 is reached for only a short time. Here, a short actuation means an actuation time that lies below a predefined limit actuation time. Therefore, when the vehicle is at a standstill or at a speed of less than 5 km/h, in the case of a short actuation time, the anti-jackknifing braking function is activated, and in the case of any actuation time exceeding this, the trailer braking function is activated. The anti-jackknifing function activated in the short actuation time therefore remains activated even in the neutral position 17. A deactivation is carried out by means of a renewed actuation of the control element 2, or automatically by means of a separate control element.

In all the exemplary embodiments depicted in FIGS. 1 to 6, a switch can be made from the first or second switching state temporarily into the third and if appropriate also into the fourth and/or fifth switching state. The actuating device can be switched from the first switching state if appropriate into the fourth or fifth switching state, and after the end of the fourth or fifth switching state, is switched back into the first switching state again. Correspondingly, the third switching state can be reached from the second switching state, wherein the actuating device, after the end of the third switching state, is switched back into the second switching state.

Figure 7:
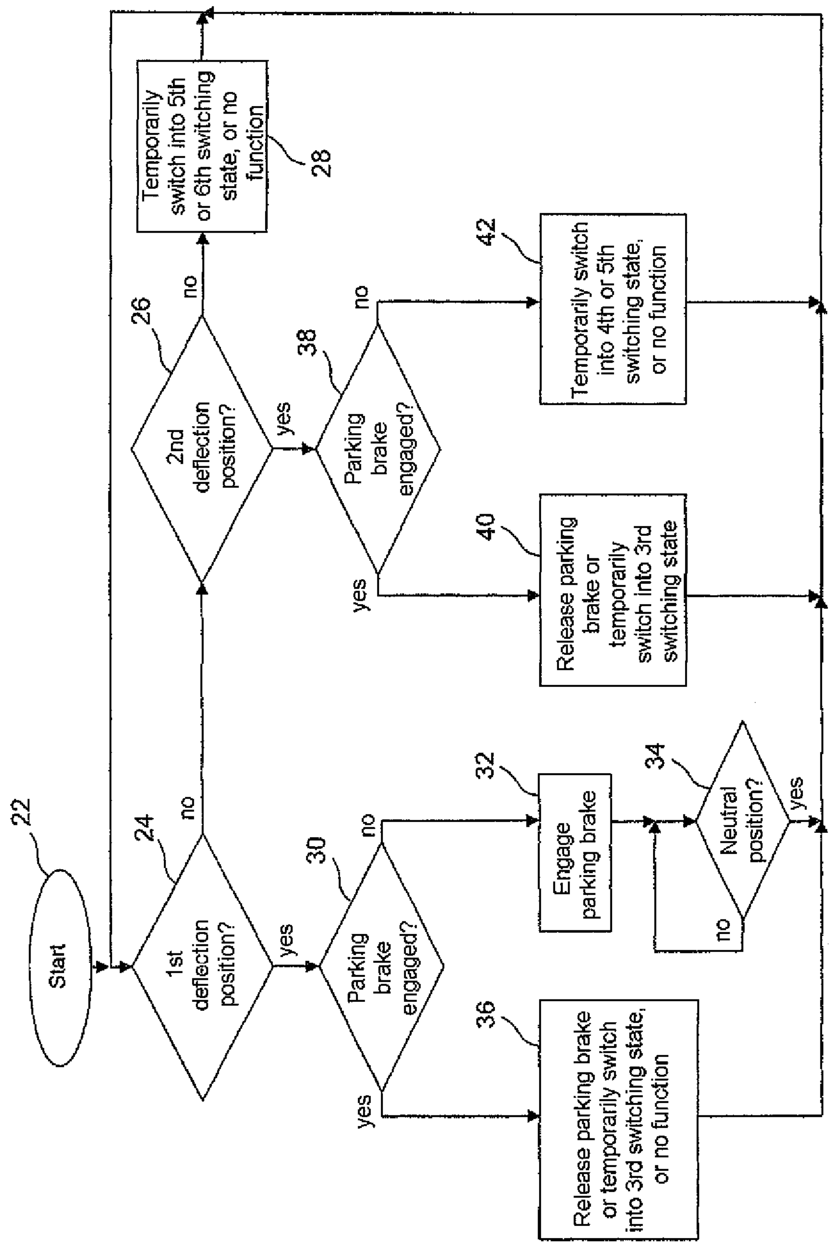
FIG. 7 is a flow diagram illustrating switching processes that can be carried out by means of the actuating device according to the first, second, third, fourth, fifth and sixth and also a seventh, eighth and ninth exemplary embodiment.

FIG. 7 is a flow diagram illustrating processes during switching by means of the actuating device according to the invention as per the first to sixth exemplary embodiments, and the seventh, eighth and ninth exemplary embodiments described below. The starting point is a step 22, for example when the actuating device is supplied with electrical energy upon a start-up of the vehicle. In step 24, the actuating device checks whether the control element 2 according to one of the exemplary embodiments depicted in FIGS. 1 to 6, or alternatively a control element designed in some other way, of the actuating device is situated in the first deflection position 18. If this is not the case, in step 26, the actuating device checks whether the control element 2 is situated in the second deflection position 20. If this is also not the case, in the case of one of the actuating devices of the exemplary embodiments according to FIGS. 1 to 6, the check in step 24 is carried out again. The control element 2 is situated in the neutral position 17, and alternately performs steps 24 and 26 until the control element 2 is situated in the first deflection position 18 or second deflection position 20.

In a seventh, eighth or ninth exemplary embodiment of the invention, a further step 28 is present between step 26 and step 24, in which step 28, after checking one or more further deflection positions or deflection regions, a switch can temporarily be made into the fifth and/or a sixth switching state.

When the check in step 24 yields that the control element is situated in the first deflection position 18, the process continues with step 30, which checks whether the parking brake is engaged. If the parking brake is not engaged, it is engaged in step 32. For this purpose, the actuating device is switched from the first or seventh switching state into the second switching state. Thereafter, step 34 checks whether the neutral position 17 has been reached again. A repeated check is carried out in step 34 for as long as the control element 2 is actuated. Only when the neutral position 17 is reached, or when the control element 2 is no longer situated in the first deflection position 18, is the process continued again with step 24.

If the parking brake is engaged, step 30 is followed by a step 36, in which, according to the exemplary embodiments depicted in FIGS. 1, 2 and 3, the parking brake is released.

To release the parking brake, the actuating device is switched into the first switching state. Alternatively, however, the actuating device may also be designed such that, in step 36, it switches into the seventh switching state for as long as the control element 2 is situated in the first deflection position 18, and switches into the first switching state only after returning to the neutral position 17 or after departing from the first deflection position 18. For a residence time in step 36, therefore, the actuating device is situated in the seventh switching state. After the first switching state is reached, the process continues with step 24.

If appropriate, between steps 24 and 26, 26 and 28 or 28 and 24, a check is performed to ascertain whether the ignition is still activated or is being or has been deactivated. If the actuating device is situated in the first switching state and a deactivation of the ignition is identified, the actuating device is switched from the first switching state into the second switching state, and the parking brake is engaged. In contrast, an automatic engagement of the parking brake is prevented if the actuating device is situated in the seventh switching state. Specifically, the seventh switching state is active if appropriate in step 36, but not between steps 24 and 26, 26 and 28 or 28 and 24.

In step 36, the actuating device according to one of the exemplary embodiments depicted in FIG. 4, 5 or 6 is temporarily switched from the second switching state into the third switching state. After departing from the first deflection position 18 or after returning into the neutral position 17, the actuating device switches back into the second switching state. Thereafter, the process continues with step 24.

In a design of the actuating device according to the ninth exemplary embodiment, step 36 may also have no function or may be omitted. In this case, step 30 is followed by step 24.

If it is identified in step 26 that the control element 2 is situated in the second deflection position 20, then in a step 38, analogous to step 30, a check is performed to ascertain whether the parking brake is engaged. If the parking brake is engaged, the process continues with a step 40, and otherwise continues with a step 42.

In the exemplary embodiments depicted in FIGS. 1, 2 and 3, in step 40, the actuating device is temporarily switched into the third switching state, in a similar way to that described with regard to step 36 in terms of the first deflection position 18 and the exemplary embodiments depicted in FIGS. 4, 5 and 6.

In the exemplary embodiments depicted in FIGS. 4, 5 and 6, however, in step 40, the actuating device is switched into the first or seventh switching state in order to release the parking brake, in a similar way to that described with regard to step 36 in terms of the first deflection position 18 and the exemplary embodiments depicted in FIGS. 1, 2 and 3.

Step 42 may have no function or may be omitted, wherein if the parking brake is not engaged, step 38 is followed by step 24. In the exemplary embodiments depicted in FIGS. 2, 3, 5 and 6, however, in step 42, a switch can temporarily be made into a fourth switching state. A switch is therefore made from the first switching state into the fourth switching state and, thereafter, back into the first switching state before the process is continued with step 24.

In the exemplary embodiments of FIGS. 3 and 6, in step 42, it is also possible for a switch to be made into the fifth switching state, wherein the fifth switching state is selected for as long as the control element 2 is situated in the second deflection position 20. Alternatively, however, the actuating device may also be designed such that the fifth switching state is maintained for as long as the control element 2, after returning from the second deflection position 20, is situated in the neutral position 17, or does not arrive again in the second deflection position 20 or some other deflection position 17. If appropriate, an automatic system may also switch back from the fifth switching state into the first switching state as a function of predefined or definable conditions.

Figure 8:
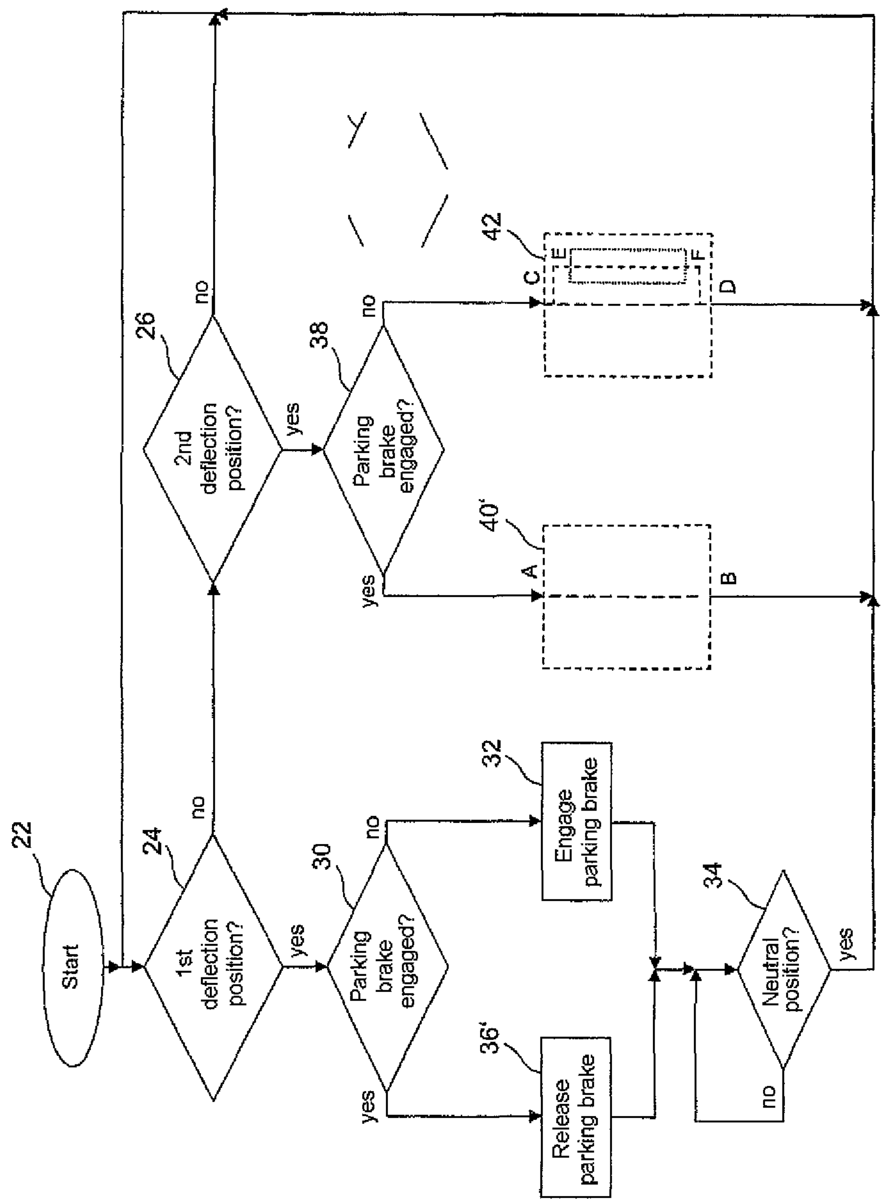
FIG. 8 is a flow diagram illustrating the switching processes of the actuating device according to the exemplary embodiments 1, 2 and 3.

FIG. 8 is a flow diagram associated with the exemplary embodiments of FIGS. 1, 2, 3 and 7. The flow diagram largely corresponds to the flow diagram according to FIG. 7, and illustrates the switching processes for the exemplary embodiments depicted in FIGS. 1, 2, 3 and 7. In particular, the same reference numerals are used to denote identical steps.

Step 28 has been omitted in relation to the exemplary embodiment according to FIG. 7. In step 36', the parking brake is released, wherein, if appropriate after a temporary switch into the seventh switching state, a switch is made into the first switching state. The alternative functions in step 36 mentioned in the description of FIG. 7 are omitted.

A step 40' is similar to step 40 of FIG. 7, wherein, however, the release of the parking brake relating to the exemplary embodiments of FIGS. 4, 5, 6, 8 and 9 is omitted. In step 40', therefore, a temporary switch is made into the third switching state.

Step 42 has already been described in general form in the description of FIG. 7. A more precise illustration of step 42 in different variants can be found in FIGS. 11, 12 and 13, which are described further below.

Figure 9:
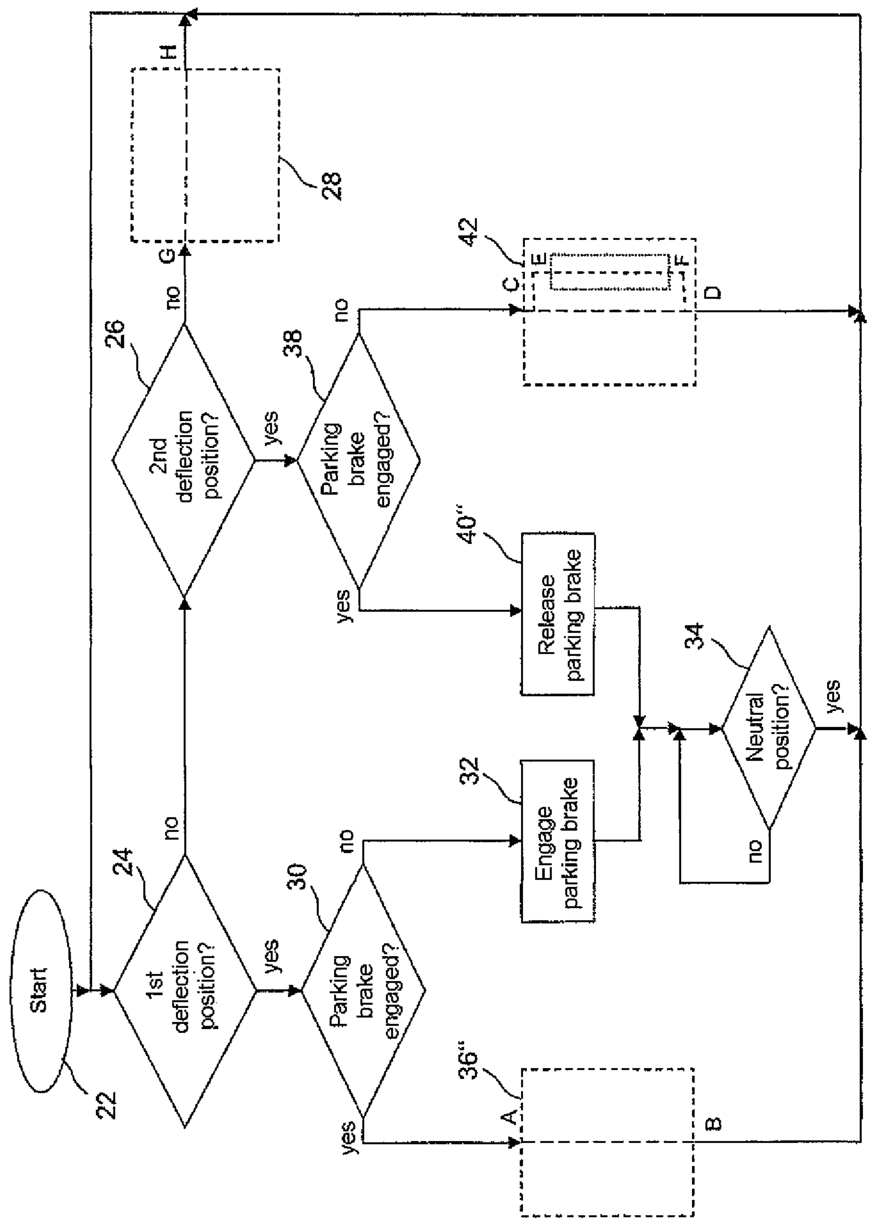
FIG. 9 is a flow diagram illustrating the switching processes of the actuating device according to the exemplary embodiments 4, 5, 6, 8 and 9.

FIG. 9 shows switching processes from FIG. 7, which are illustrated with regard to the exemplary embodiments of FIGS. 4, 5, 6, 8 and 9. The same reference numerals are again used to denote identical steps. In step 40", the parking brake is released. In these exemplary embodiments, the alternative switch into the third switching state in step 40" is eliminated. In the exemplary embodiments according to FIGS. 4, 5, 6 and 8, the switch into the third switching state takes place in a step 36". In the exemplary embodiment of FIG. 9, step 36" has no function, or can be omitted.

Steps 40" and 36" in the exemplary embodiments depicted in FIGS. 4, 5, 6 and 8 are similar to steps 36' and 40' in the exemplary embodiments of FIGS. 1, 2, 3 and 7. If the parking brake is engaged, the functions called up in the first deflection position 18 and in the second deflection position 20 are interchanged.

The sequence in which steps 24, 26 and if appropriate 28 are run through is arbitrary. In alternative embodiments that are not shown, steps 24, 26 and if appropriate 28 may therefore be arbitrarily interchanged with one another in relation to the exemplary embodiments shown.

Figure 10:
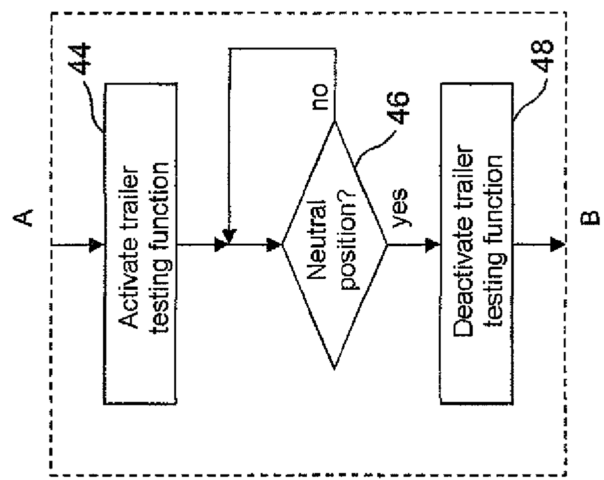
FIG. 10 is a flow diagram illustrating exemplary process steps between positions A and B in FIGS. 8 and 9.

FIG. 10 shows step 40' of FIG. 8 with regard to the exemplary embodiments of FIGS. 1, 2, 3 and 7, or step 36" of FIG. 9 with regard to the exemplary embodiments of FIGS. 4, 5, 6 and 8, in detail. In a step 44, the actuating device is switched from the second switching state into the third switching state. In the third switching state, for a trailer testing function, the second braking action for a trailer vehicle coupled to the vehicle but not the first braking action of the vehicle is changed in relation to the second switching state. In particular, the second braking action but not the first braking action is inverted. Therefore, the parking brake on the trailer vehicle is released and remains released for as long as the control element is situated in the second or first deflection position 20 or 18 or at least has not yet reached the neutral position 17 again. When it is detected in a step 46 that the neutral position 17 has been reached, the trailer testing function is deactivated in a step 48, wherein the actuating device is switched from the third switching state back into the second switching state. Thereafter, the process is continued with step 24.

In the exemplary embodiment of FIG. 9, steps between the letters A and B may be omitted, and consequently the arrangement according to FIG. 10 replaced with a continuous arrow between A and B.

Figure 11:
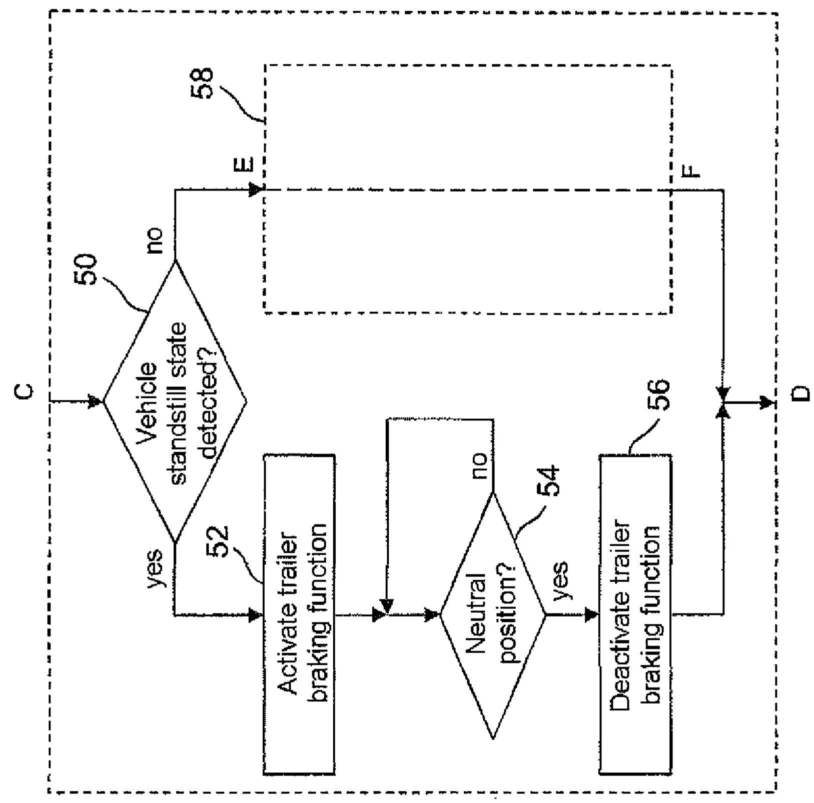
FIG. 11 is a flow diagram illustrating exemplary process steps between positions C and D in FIGS. 8 and 9.

FIG. 11 shows the section 42 in FIGS. 7, 8 and 9 in the case of the second, third, fifth, sixth, seventh and eighth exemplary embodiments in detail. Step 42 has a step 50 in which it is initially established whether the vehicle is stationary or moving with a speed of less than 5 km/h. If this is the case, in a step 52, the actuating device switches from the first switching state into the fourth switching state, in which a trailer braking function is activated. Only after a departure, identified in step 54, from the relevant deflection position 18 or 20, or after a return into the neutral position 17, is the trailer braking function deactivated again in step 56, and consequently a switch made from the fourth switching state into the first switching state. This is followed again by step 24 as per FIGS. 8 and 9.

However, if it is identified in step 50 that the vehicle is moving, in particular with a minimum speed of 5 km/h, instead of steps 52, 54 and 56, a step 58 is executed, which has no function in the case of the second and fifth exemplary embodiments but which can effect a switch into the fifth switching state in the third and sixth exemplary embodiments.

Figure 12:
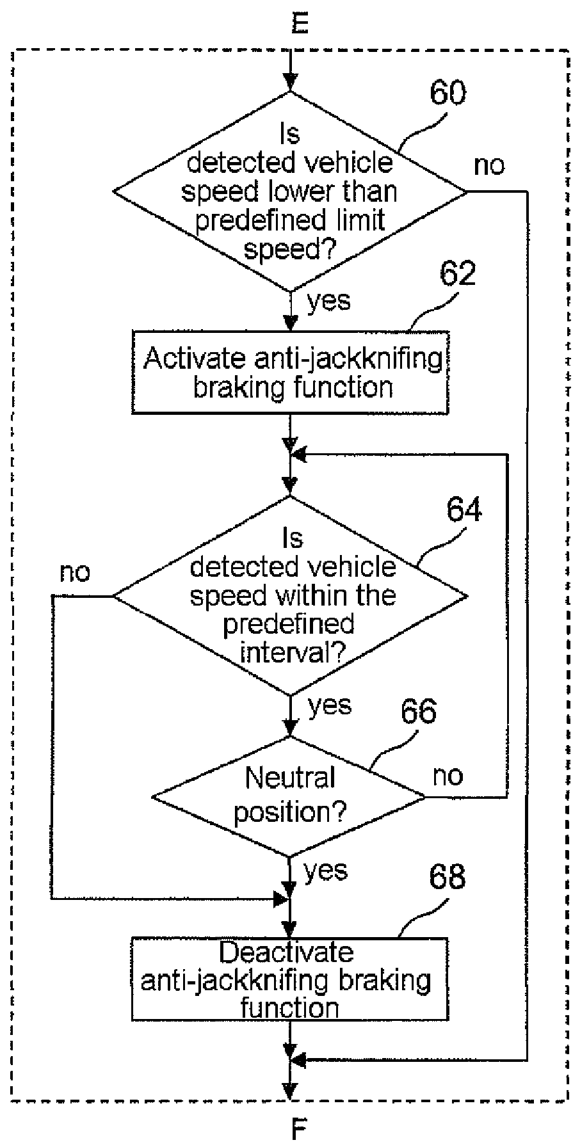
FIG. 12 is a flow diagram illustrating exemplary process steps between positions E and F in FIG. 11.

FIG. 12 shows step 58 between the letters E and F of FIG. 11 as per the exemplary embodiments of FIGS. 3 and 6 in detail. For the activation of the fifth switching state or the anti-jackknifing braking function, a speed interval is predefined. The speed interval is limited in the direction of high speeds by a predefined limit speed. In a step 60, it is first identified whether a detected vehicle speed is lower than the predefined limit speed. If this is not the case, the process passes via F and D in FIG. 8 and finally to step 24.

Otherwise, in step 62, a switch is made into the fifth switching state, in particular the anti-jackknifing braking function. In further steps 64 and 66, it is checked whether the detected vehicle speed lies within the predefined speed interval or whether the control element 2 is already situated in the neutral position 17 again. Here, steps 64 and 66 are carried out repeatedly until either the detected vehicle speed no longer lies within the predefined interval, or the neutral position 17 is reached or the second deflection position 20 has been departed from. Thereafter, in a step 68, the fifth switching state or the anti-jackknifing braking function is deactivated, wherein the actuating device switches from the fifth switching state back into the first switching state. This is followed, via F and D as per FIGS. 8 and 9, by step 24.

Figure 13:
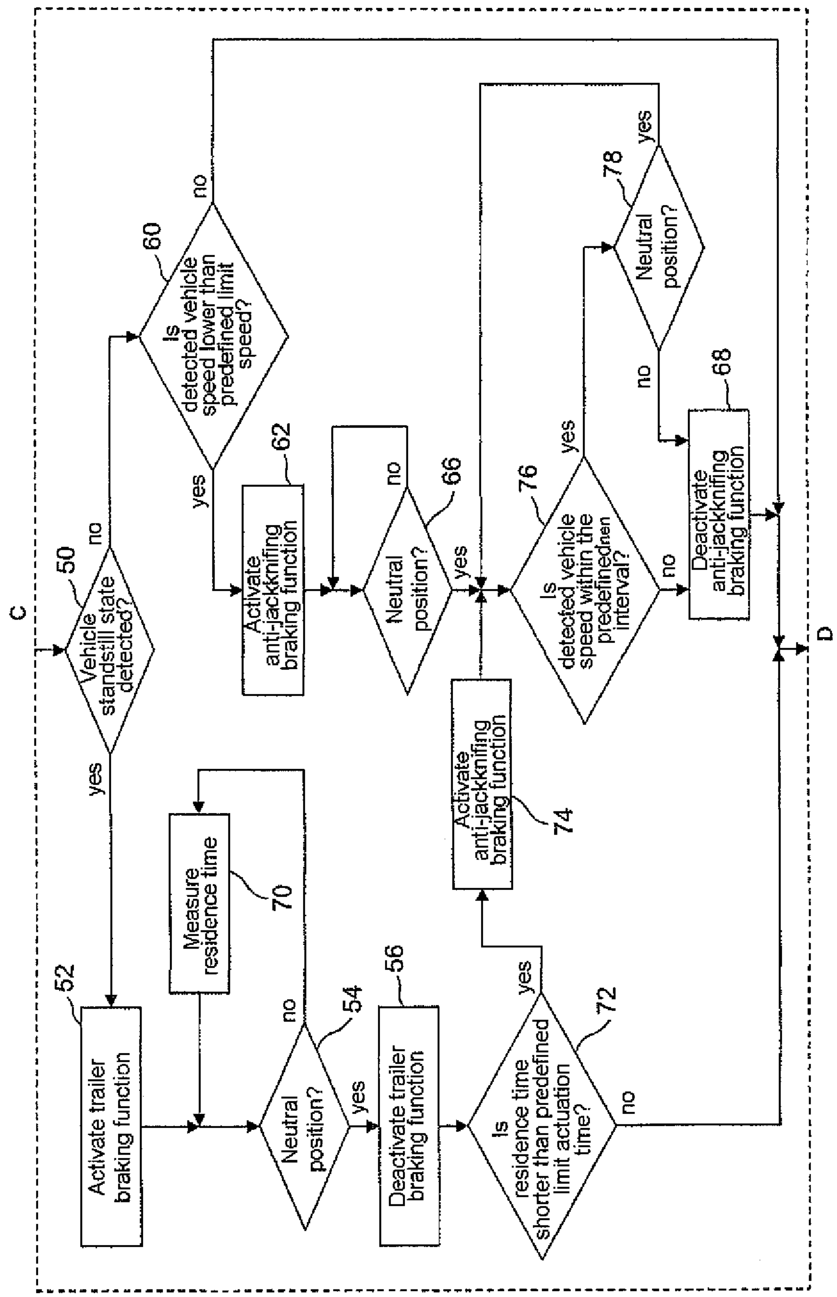
FIG. 13 is a flow diagram illustrating alternative exemplary process steps between positions C and D in FIGS. 8 and 9.

FIG. 13 shows a sequence between the letters C and D in FIGS. 8 and 9, or step 42 in FIGS. 7, 8 and 9, corresponding to the exemplary embodiment according to FIG. 7 or FIG. 8. Here, step 42 comprises an alternative sequence to the sequence as per FIG. 11 in conjunction with FIG. 12. Here, the sequence as per FIG. 13 provides the possibility of switching into the fifth switching state, and activating the anti-jackknifing function, even when the vehicle is at a standstill or at a speed of less than 5 km/h. For this purpose, the sequence as per FIG. 11 has been expanded by further steps. Steps having the same reference numerals denote identical steps, for which reason reference is made, with regard to their function, to the statements made with regard to FIGS. 11 and 12.

The actuating device now not only waits in step 54 until the neutral position 17 is reached. In fact, a residence time of the control element 2 in the second deflection position, or a duration until the neutral position 17 is reached, is additionally determined in a step 70. After the deactivation of the trailer braking function in step 56, or after a switch into the first switching state, the process passes via a step 72 to the point marked D if the measured residence time is longer or not shorter than a predefined limit actuation time. The limit actuation time may alternatively also be predefinable or if appropriate automatically adapted as a function of vehicle states and/or driving states.

However, if the control element 2 has been actuated in the second deflection position only briefly, and consequently the residence time is shorter than the predefined limit actuation time, after a step 72 the anti-jackknifing braking function is activated, or a switch is made into the fifth switching state, in a step 74.

Thereafter, in a step 76, similar to step 64, it is determined whether the detected vehicle speed lies within the predefined speed interval. If this is not the case, in step 68, the anti-jackknifing braking function is deactivated, or a switch is made back into the first switching state. Otherwise, it is established in a step 78 whether the control element 2 is still situated in the neutral position 17. If this is the case, then via a loop, the process is continued again with step 76. Otherwise, in step 68, a switch is made back into the first switching state, and the anti-jackknifing braking function is deactivated.

If appropriate, in a deviation from FIG. 13, step 64 may be inserted between step 62 and step 66, corresponding to the sequence of FIG. 12. Here, step 64 would cause the process to continue with step 76 if the detected vehicle speed no longer lies within the predefined interval while the control element 2 is still in the second deflection position 20 or has not yet reached the neutral position 17.

Figure 14:
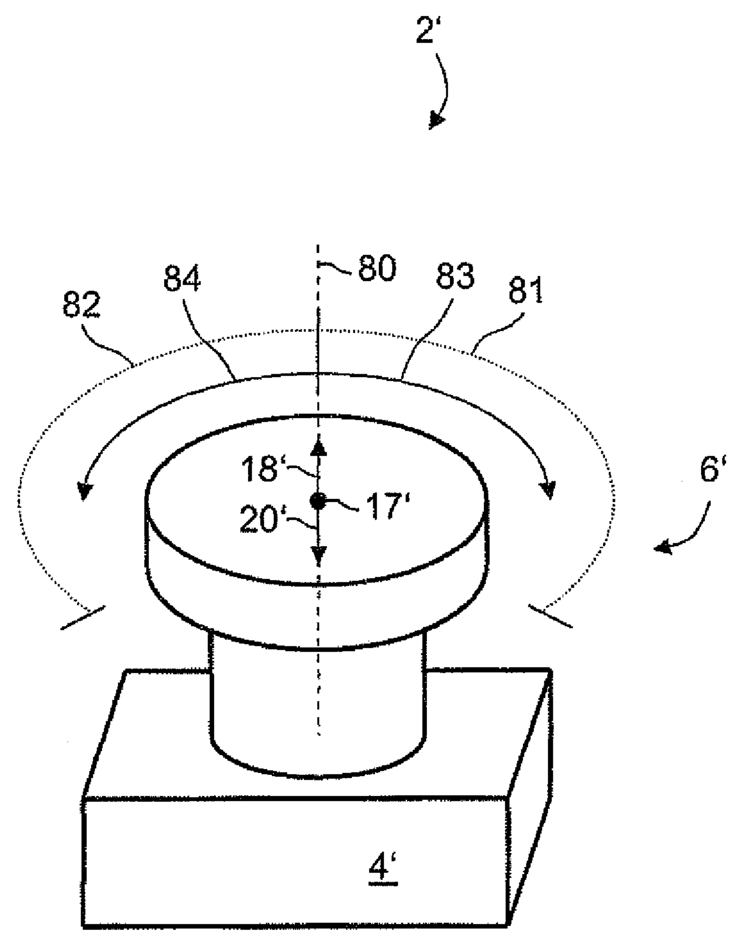
FIG. 14 shows a control element of an actuating device according to the ninth exemplary embodiment of the invention.

FIG. 14 shows a control element 2' of an actuating device as per the ninth exemplary embodiment of the invention. The control element 2' has an actuator 6' designed as a knob arranged so as to be movable relative to the base element 4' along an axis 80 and so as to be pivotable relative to the base element 4' about said axis 80. The actuator 6' or the control element 2' automatically assumes a predetermined neutral position 17', indicated in the figure by a point, when not subjected to external action. By pulling the actuator 6', a first deflection position 18' indicated by an arrow can be reached in order to switch into the second switching state or engage the parking brake. In contrast, by pushing the actuator 6' in the direction of the base element 4', a second deflection position 20' indicated by a further arrow is reached in order to switch into the first switching state or release the parking brake.

The neutral position 17' is adjoined by a first deflection region 81 and a second deflection region 82. In particular, the first deflection region 81 is reached by means of a clockwise rotation proceeding from the neutral position 17', whereas the second deflection region 82 is reached by means of a counterclockwise rotation proceeding from the neutral position 17'. Alternatively, however, the deflection regions 81 and 82 may, like the deflection regions 18' and 20', be interchanged.

A third deflection position 83, indicated by an arrow, for switching into the fifth switching state, or selecting an anti-jackknifing braking function, is arranged in the first deflection region 81. A further arrow indicates a fourth deflection position 84, which is arranged in the second deflection region 82, for switching into a sixth switching state, or selecting a dynamic braking function. The dynamic braking function generates both the first braking action and the second braking action, wherein the two braking actions are dimensioned according to the present deflection position in the second deflection region 82. The first braking action and second braking action may be realized by means of the parking brake or by means of a service braking action triggered by data message. Correspondingly, the second braking action in the anti-jackknifing braking function is dimensioned according to the present deflection position in the first deflection region 81.

As an alternative to the exemplary embodiment according to FIG. 14, a control element may be provided that has an actuator designed as a lever or knob that can be deflected or pivoted in the manner of a joystick in four directions proceeding from a neutral position. For example, the actuating element may be deflected forward into a first deflection position and rearward into a second deflection position in order to engage and release the parking brake. A third deflection position and fourth deflection position, or a first deflection region and second deflection region, are reached by means of a deflection to the left or right, in order thereby to activate an anti-jackknifing braking function or dynamic braking function.

Figure 15:
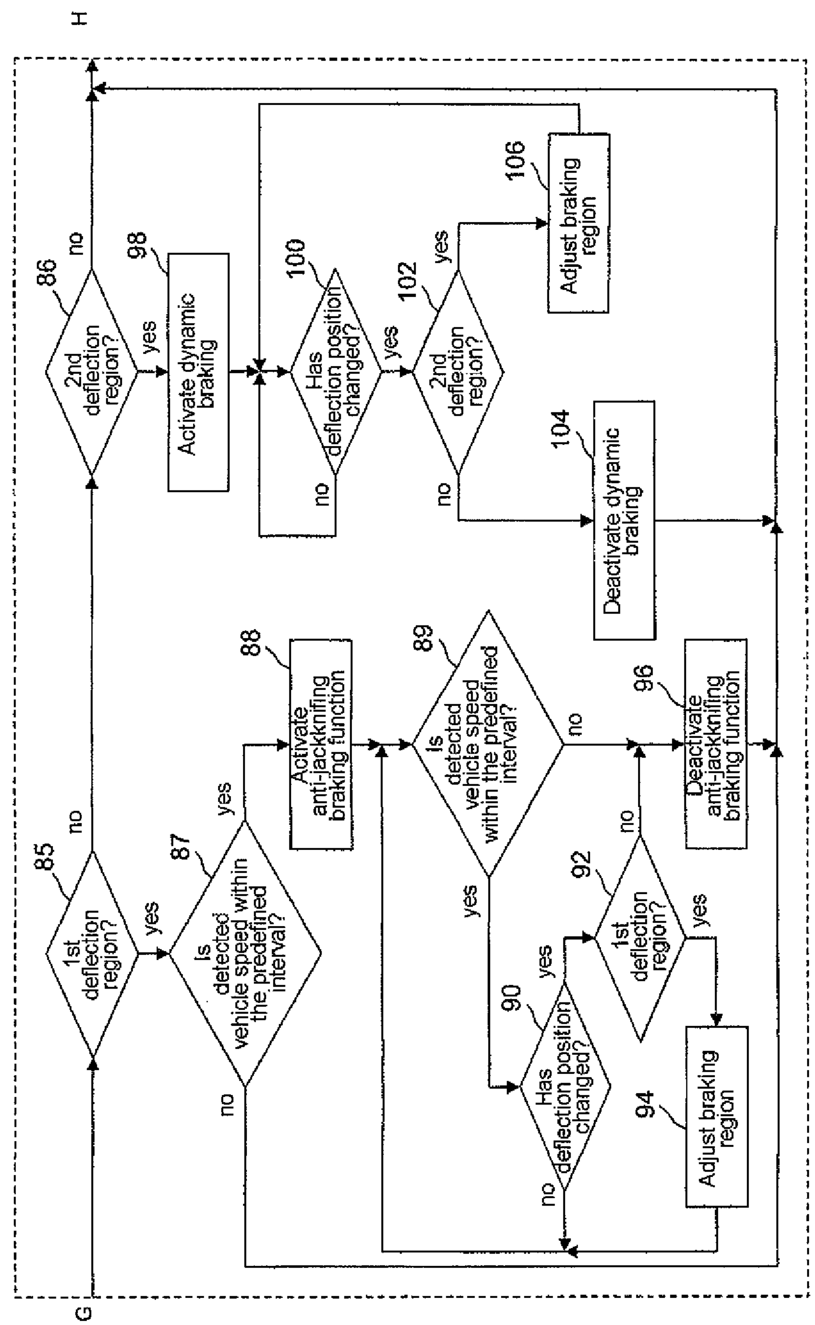
FIG. 15 is a flow diagram illustrating exemplary process steps between positions G and H in FIG. 9.

FIG. 15 relates to the ninth exemplary embodiment with the control element 2' of FIG. 14, and shows a sequence arranged in FIG. 9 between the letters G and H and describes in detail step 28 in FIG. 9 for the ninth exemplary embodiment. In contrast, in the other exemplary embodiments, step 28 may have no function or may be omitted.

Proceeding from G, in a step 85, the actuating device establishes whether the control element 2' is situated in the first deflection region 81. If this is not the case, it is subsequently established in a step 86 whether the control element 2' is situated in the second deflection region 82. If this is also not the case, the process continues via H to step 24 as per FIG. 9. Steps 24, 26, 85 and 86 may, as an alternative to the exemplary embodiment shown, be run through in any other desired sequence.

If, in step 85, a deflection in the first deflection region 81 is identified, it is checked in a step 87 whether the detected vehicle speed lies within the predefined speed interval. If this is not the case, nothing further is initiated, and the process continues via H. Otherwise, in a step 88, a switch is made into the fifth switching state, and the anti-jackknifing braking function is activated corresponding to the position in the deflection region or the deflection. This is followed by a further check in a step 89 as to whether the vehicle speed lies within the predefined speed interval. If this is the case, the process continues with step 90, in which it is checked whether a position of the control element 2 in the first deflection region 81 has changed. If this is not the case, the process passes back to step 89, such that the anti-jackknifing braking function remains activated for as long as the vehicle speed lies within the predefined speed interval and the position does not change.

However, if it is established in step 90 that the deflection or position has changed, it is checked in step 92 whether the position is still in the first deflection region 81. If this is the case, in step 94, the braking action is adjusted corresponding to the position of the control element 2'. For example, a further deflection from the neutral position 17 in the first deflection region 81 increases the second braking action on the trailer vehicle, while a reduction of the deflection also reduces the second braking action.

When either it is identified in step 89 that the detected vehicle speed no longer lies within the predefined speed interval, or it is identified in step 92 that the position is no longer situated in the first deflection region 81, in step 96, a switch is made back into the first switching state, or the anti-jackknifing braking function is deactivated, before the process departs from the section of the flow diagram illustrated in FIG. 15 via H.

If a deflection of the control element 2' in the second deflection region 82 is identified in step 86, in a step 98, a sixth switching state, or dynamic braking, is activated.

Both the first braking action on the vehicle and also the second braking action on the trailer vehicle are generated corresponding to the deflection or position in the second deflection region 82. The braking actions remain unchanged for as long as it is subsequently identified in step 100 that the position has not changed. After a change in the position, however, it is established in step 102 whether the position is still situated in the second deflection region 82. If this is not the case, then a switch is made from the sixth switching state back into the first switching state, or the dynamic braking is deactivated. Thereafter, the process passes to H.

However, if the position has changed without a departure from the second deflection region 82, in step 106, the braking actions for the vehicle and for the trailer vehicle are adjusted corresponding to the deflection in the second deflection region 82. Here, an increase of the deflection proceeding from the neutral position 17' leads to an increase of the braking actions. Correspondingly, a decrease of the deflection leads to a reduction of the braking actions. After the adjustment of the braking actions in step 106, the process passes back to step 100, where it is checked again whether the position has changed in relation to the most recently established position in the second deflection region 82.

All of the features specified in the above description of the figures, in the claims and in the introductory part of the description can be implemented both individually and also in any desired combination with one another. The invention is therefore not restricted to the described and claimed combinations of features. All combinations of features should in fact be regarded as being disclosed.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An actuating device for a parking brake of a vehicle, the vehicle having a service brake and the parking brake is configured to generate a first braking action independent of a braking process of the service brake, the actuating device comprising a manually actuatable control element for actuating the parking brake, the control element having a plurality of deflection positions, the actuating device being configured to assume (i) a first switching state in which the parking brake is released and the first braking action cannot be provided, (ii) a second switching state in which the parking brake is engaged and the first braking action can be provided, and (iii) a further switching state, wherein in a first deflection position when the parking brake is released the actuating device is switchable into the second switching state, and wherein when the parking brake is engaged the actuating device is switchable into the first switching state.

2. The actuating device as claimed in claim 1, wherein the vehicle is a tractor vehicle, wherein a second braking action for a trailer vehicle coupled to the tractor vehicle can be generated by the parking brake independently of a braking process of the service brake of the tractor vehicle, wherein in the first switching state the second braking action of the parking brake cannot be provided, wherein in the second switching state the second braking action of the parking brake can be provided, wherein the control element has a predetermined neutral position and is configured to assume the neutral position when not subjected to external action, wherein the deflection positions are spaced apart from the neutral position in different directions, and wherein in the further switching state the second braking action but not the first braking action is changed in relation to at least one of the first and second switching state.

3. The actuating device as claimed in claim 2, wherein when the parking brake is engaged the actuating device in a second deflection position is switchable into the first switching state to release the parking brake, and in the first deflection position is switchable into the further switching state to provide a trailer testing function, and wherein the further switching state is a third switching state in which the first braking action but not the second braking action can be provided.

4. The actuating device as claimed in claim 2, wherein when the parking brake is engaged the actuating device in the first deflection position is switchable into the first switching state to release the parking brake, and in a second deflection position is switchable into the further switching state to provide a trailer testing function, and wherein the further switching state is a third switching state in which the first braking action but not the second braking action can be provided.

5. The actuating device as claimed in claim 2, wherein when the parking brake is released the actuating device in a second deflection position is switchable into a fourth switching state to provide a trailer braking function, and wherein in the fourth switching state the second braking action but not the first braking action can be provided.

6. The actuating device as claimed in claim 5, further comprising a detector for detecting one of a vehicle standstill state and a vehicle speed, and wherein the actuating device is switchable into the fourth switching state only when one of the vehicle standstill state is detected and a vehicle speed is detected that is below a predefinable maximum speed.

7. The actuating device as claimed in claim 5, wherein when the parking brake is released the actuating device in the second deflection position is switchable into a fifth switching state to provide an anti-jackknifing braking function, and wherein in the fifth switching state the second braking action but not the first braking action can be provided.

8. The actuating device as claimed in claim 7, further comprising a detector for detecting one of a vehicle standstill state and a vehicle speed, and wherein the actuating device is switchable into the fifth switching state only when a vehicle speed is detected that is within a predefinable speed interval.

9. The actuating device as claimed in claim 5, wherein a residence time of the control element in the second deflection position is detectable, and when the parking brake is released and the detected residence time after a return into the neutral position is below a predefinable limit actuating time the actuating device is switchable into a fifth switching state, and wherein in the fifth switching state to provide an anti-jackknifing braking function the second braking action but not the first braking action can be provided.

10. The actuating device as claimed in claim 2, wherein when the parking brake is engaged the actuating device in a second deflection position is switchable into the first switching state to release the parking brake, wherein the control element has a third deflection position and the actuating device in the third deflection position when the parking brake is released is switchable into the further switching state to provide an anti-jackknifing braking function, and wherein the further switching state is a fifth switching state in which the second braking action but not the first braking action can be provided.

11. The actuating device as claimed in claim 10, wherein the second braking action can be varied in one of a continuous and stepped fashion, wherein the third deflection position is in a first deflection region adjacent to the neutral position, and wherein the second braking action is dimensioned according to a position in the first deflection region.

12. The actuating device as claimed in claim 2, wherein the control element has a fourth deflection position in a second deflection region adjacent to the neutral position, wherein the actuating device in the fourth deflection position when the parking brake is released is switchable into a sixth switching state to provide a dynamic braking function, wherein in the sixth switching state the first braking action and the second braking action can be provided in one of a continuous and stepped fashion, and wherein the first braking action and the second braking action are dimensioned according to a position in the second deflection region.

13. The actuating device as claimed in claim 10, wherein in response to at least one of (i) a departure from one of the third and a fourth deflection position and (ii) a return into the neutral position, the actuating device is switchable into the first switching state.

14. The actuating device as claimed in claim 10, wherein the control element has an actuator that in relation to a base element of the control element can be pushed and pulled along an axis and pivoted about the axis, wherein proceeding from the neutral position the first deflection position is reachable by pulling, the second deflection position is reachable by pushing, the third deflection position is reachable by pivoting in a first direction, and a fourth deflection position is reachable by pivoting in a second direction.

15. The actuating device as claimed in claim 14, wherein the control element is configured such that the first deflection position is reachable proceeding from the second deflection position and the second deflection position is reachable proceeding from the first deflection position, and the first and second deflection positions are reachable proceeding from the third and fourth deflection positions via the neutral position, and wherein the control element when it is in one of the third and fourth deflection position moves initially into the neutral position and subsequently into one of the first and second deflection positions in response to one of a pulling and pushing action.

16. The actuating device as claimed in claim 2, wherein the actuating device is configured to assume a seventh switching state in which the first braking action and the second braking action of the parking brake cannot be provided, wherein the actuating device when it is in the first switching state can be automatically switched into the second switching state in response to deactivation of an ignition, and wherein the actuating device is configured to prevent automatic switching into the second switching state when the actuating device is in the seventh switching state.

17. The actuating device as claimed in claim 1, wherein the further switching state is a seventh switching state in which the first braking action and the second braking action of the parking brake cannot be provided, wherein the actuating device when it is in the first switching state can be automatically switched from the first switching state into the second switching state in response to deactivation of an ignition, and wherein the actuating device is configured to prevent automatic switching into the second switching state when the actuating device is in the seventh switching state.

18. The actuating device as claimed in claim 17, wherein the actuating device is configured such that in the deflection position one of in which and after the departure from which the actuating device is switchable into the first switching state, the actuating device is initially switched into the seventh switching state to prevent the automatic switching, and is switched into the first switching state only after one of departing from the deflection position and after returning into a neutral position.

19. The actuating device as claimed in claim 17, wherein the actuating device is configured such that in response to actuation of at least one further control element the actuating device is switchable into the seventh switching state for one of (i) the duration of the actuation and (ii) until renewed actuation of the further control element and (iii) for a predetermined time duration and (iv) until the control element is actuated and (v) until another further control element is actuated.

20. A method for actuating an actuating device for a parking brake of a vehicle, the vehicle having a service brake and the parking brake is configured to generate a first braking action independent of a braking process of the service brake, wherein the actuating device releases the parking brake in response to a switch into a first switching state, wherein when the parking brake is released the first braking action is not provided, wherein the actuating device engages the parking brake in response to a switch into a second switching state, wherein when the parking brake is engaged the first braking action of the parking brake is provided, wherein the actuating device has a manually actuatable control element for actuating the parking brake, the control element having a plurality of deflection positions, the method comprising the steps of switching the actuating device into the second switching state in response to an actuation in a first deflection position when the parking brake is released, switching the actuating device into the first switching state in response to an actuation when the parking brake is engaged, and switching the actuating device into a further switching state in response to an actuation.

21. The method as claimed in claim 20, wherein the vehicle is a tractor vehicle, wherein the actuating device, by means of the parking brake, generates a second braking action for a trailer vehicle coupled to the tractor vehicle independently of a braking process of the service brake, wherein the actuating device, in the first switching state, does not provide the second braking action of the parking brake, wherein the actuating device, in the second switching state, provides the second braking action of the parking brake, wherein the control element has a predetermined neutral position and assumes the neutral position when not subjected to external action, wherein the deflection positions are spaced apart from the neutral position in different directions, and wherein in response to a switch into the further switching state, the second braking action but not the first braking action is changed in relation to at least one of the first and second switching states.

22. The method as claimed in claim 21, wherein when the parking brake is engaged and the control element is deflected into a second deflection position, the actuating device is switched into the first switching state to release the parking brake, and when the control element is deflected into the first deflection position, the actuating device is switched into the further switching state to provide a trailer testing function, and wherein the further switching state is a third switching state in which the first braking action but not the second braking action is provided.

23. The method as claimed in claim 21, wherein when the parking brake is engaged the control element is deflected into the first deflection position, the actuating device, in response to a deflection into the first deflection position, is switched into the first switching state to release the parking brake, and when the control element is switched into a second deflection position, the actuating device is switched into the further switching state to provide a trailer testing function, and wherein the further switching state is a third switching state in which the first braking action but not the second braking action is provided.

24. The method as claimed in claim 20, wherein the further switching state is a seventh switching state in which the first braking action and the second braking action of the parking brake are not provided, wherein the actuating device when it is in the first switching state is automatically switched into the second switching state in response to a-deactivation of an ignition, and the actuating device prevents the automatic switching into the second switching state when the actuating device is in the seventh switching state.

* * * * *